(12) United States Patent
Edsall et al.

(10) Patent No.: US 6,735,198 B1
(45) Date of Patent: May 11, 2004

(54) METHOD AND APPARATUS FOR UPDATING AND SYNCHRONIZING FORWARDING TABLES IN A DISTRIBUTED NETWORK SWITCH

(75) Inventors: Thomas J. Edsall, Cupertino, CA (US); Herman Levenson, Palo Alto, CA (US); Claudette Lucille Surma, Fremont, CA (US); Ajit Sanzgiri, Cupertino, CA (US); Saravanakumar Rajendran, San Jose, CA (US); Rong-Lung Lue, Saratoga, CA (US); Tuan Thanh Nguyen, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/469,062

(22) Filed: Dec. 21, 1999

(51) Int. Cl.[7] .............................. H04L 12/28; H04J 3/16; H04J 3/06
(52) U.S. Cl. ........................ 370/389; 370/401; 370/469; 370/512
(58) Field of Search ................................. 370/389, 390, 370/392, 362, 400, 401, 419, 420, 423, 469, 471, 472, 428, 412, 422, 462, 463; 340/2.28; 709/238

(56) References Cited

U.S. PATENT DOCUMENTS

| | | | |
|---|---|---|---|
| 5,394,402 A | 2/1995 | Ross | |
| 5,740,171 A | 4/1998 | Mazzola et al. | |
| 5,796,732 A | 8/1998 | Mazzola et al. | |
| 5,852,607 A | 12/1998 | Chin | |
| 5,872,783 A | 2/1999 | Chin | |
| 5,917,820 A | 6/1999 | Rekhter | |
| 6,035,105 A | 3/2000 | McCloghrie et al. | |
| 6,128,296 A | 10/2000 | Daruwalla et al. | |
| 6,147,993 A | 11/2000 | Kloth et al. | |
| 6,175,571 B1 * | 1/2001 | Haddock et al. | 370/423 |
| 6,208,649 B1 | 3/2001 | Kloth | |
| 6,219,699 B1 | 4/2001 | McCloghrie et al. | |
| 6,310,882 B1 * | 10/2001 | Lorenz et al. | 370/401 |
| 6,430,188 B1 * | 8/2002 | Kadambi et al. | 370/398 |
| 6,553,000 B1 * | 4/2003 | Ganesh et al. | 370/235 |

OTHER PUBLICATIONS

U.S. patent application Ser. No. 09/469,459, Edsall et al., filed Dec. 12, 1999.

(List continued on next page.)

Primary Examiner—Duc Ho
(74) Attorney, Agent, or Firm—Cesari and McKenna, LLP

(57) ABSTRACT

A mechanism and technique updates and synchronizes forwarding tables contained on line cards that are interconnected by a switch fabric of a distributed network switch. The network switch is preferably a L3 or L4 switch comprising a plurality of forwarding engines distributed among the line cards. Each forwarding engine has an associated forwarding table, which preferably includes a L2 portion and L3/L4 portions. The L2 portion of the table is used to execute forwarding decision operations for frames forwarded among ports of the line cards, whereas the L3/L4 portions of the table are used to execute shortcut and forwarding operations for frames routed among the ports. The mechanism comprises a media access control (MAC) notification (MN) frame for updating and synchronizing the location of a destination port stored in the L2 portions of the forwarding tables.

42 Claims, 7 Drawing Sheets

OTHER PUBLICATIONS

Andrew S. Tananbaum, "Computer Networks," 1996, pp. 35–37, Third Edition, Prentice–Hall.

IEEE Std 802.1Q–1998, "IEEE Standards for Local and Metropolitan Area Networks: Virtual Bridged Local Area Networks", Copyright by the Institute of Electrical and Electronics Engineers, Inc., Mar 8, 1999, pp. 1–199.

U.S. patent application Ser. No. 09/469,459, Edsall et al., filed Dec. 21, 1999.

U.S. patent application Ser. No. 09/617,581, Kloth et al., Jul. 14, 2000.

U.S. patent application Ser. No. 09/162,730, Ullum et al., Sep. 29, 1998.

U.S. patent application Ser. No. 09/580,384, McCloghrie et al., May 26, 2000.

U.S. patent application Ser. No. 09/667,296, McCloghrie et al., Sep. 22, 2000.

* cited by examiner

|  | PORT SELECT 720 | POE VECTOR 730 |
|---|---|---|
| 0, 0 | 0 0 0 1 | 1 0 0 0 |
| 2, 2 | 0 0 0 1 | 0 0 1 0 |
| ⋮ | | |
| | | |

FIG. 7

| POE 802 |
|---|
| DESTINATION INDEX 804 |
| SOURCE INDEX 806 |
| VLAN ID 816 |
| DESTINATION ADDRESS 808 |
| SOURCE ADDRESS 810 |
| DF BIT 812 | RF BIT 814 |

FIG. 8

METHOD AND APPARATUS FOR UPDATING AND SYNCHRONIZING FORWARDING TABLES IN A DISTRIBUTED NETWORK SWITCH

CROSS-REFERENCE TO RELATED APPLICATIONS

This invention is related to the following copending and commonly-assigned U.S. Patent Applications:

U.S. patent application Ser. No. 08/951,820 titled, Method and Apparatus for Implementing Forwarding Decision Shortcuts at a Network Switch, filed on Oct. 14, 1997, issued on Nov. 14, 2000 as U.S. Pat. No. 6,147,993; and U.S. patent application Ser. No. 09/469,459 titled, Method and Apparatus for Learning and Switching Frames in a Distributed Network Switch, filed herewith, which applications are hereby incorporated by reference.

FIELD OF THE INVENTION

This invention relates generally to computer networks and, more specifically, to a network switch having a distributed forwarding mechanism architecture for updating and synchronizing forwarding tables within the switch.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may be a router or switch that interconnects the communication links and subnetworks to enable transmission of data between the end stations. A local area network (LAN) is an example of a subnetwork that provides relatively short distance communication among the interconnected stations, whereas a wide area network enables long distance communication over links provided by public or private telecommunications facilities. Accordingly, the switch may be utilized to provide a "switching" function for transferring information between, e.g., LANs.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allows expansion of communication to other end stations. Collectively, these hardware and software components comprise a communications network and their interconnections are defined by an underlying architecture.

Modem communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. An example of such a communications architecture is the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 accepts industry standards defining a flexible network architecture oriented to the implementation of LANS.

Specifically, the network interface layer 120 comprises physical and data link sublayers. The physical layer 126 is concerned with the actual transmission of signals across the communication channel and defines the types of cabling, plugs and connectors used in connection with the channel. The data link layer (i.e., "layer 2") is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The primary network layer protocol of the Internet architecture is the Internet protocol (IP) contained within the internetwork layer 116 (i.e., "layer 3"). IP is a network protocol that provides internetwork routing and that relies on transport protocols for end-to-end reliability. An example of such a transport protocol is the Transmission Control Protocol (TCP) contained within the transport layer 114 (i.e., "layer 4"). The term TCP/IP is commonly used to refer to the Internet architecture; the TCP/IP architecture is well-known and described in *Computer Networks, 3rd Edition*, by Andrew S. Tanenbaum, published by Prentice-Hall (1996).

A router is an intelligent intermediate node that implements network services such as route processing, path determination and path switching functions. The route processing function allows a router to determine the type of routing needed for a packet, whereas the path switching function allows a router to accept a packet on one interface and forward it on a second interface. The path determination function enables the router to select the most appropriate interface for forwarding a packet. A switch, on the other hand, provides the basic functions of a bridge including filtering of data traffic by MAC address, "leaning" of a MAC address based upon a source MAC address of a frame and forwarding of the frame based upon a destination MAC address. In addition, the switch provides the path switching capability of a router.

FIG. 2 is a highly schematic block diagram of a conventional bus-based network switch 200 comprising a plurality of ports (P) coupled to forwarding engine circuitry (FE) via a bus 210. The ports may be implemented on various line cards (LC) of the switch, while the forwarding engine may be located on a separate supervisor card (SC). Broadly stated, when a frame is received at a port of the network switch, it is driven over the bus to all of the ports as a forwarding decision is rendered by the forwarding engine. The forwarding engine renders the forwarding decision by, inter alia, accessing a forwarding table (FwdT) to "look-up" a destination MAC address of the frame. If the destination MAC address is in the table, the forwarding decision is passed to all of the ports and only those ports selected by the decision receive the frame, while all of the other ports discard the frame. An example of such a bus-based network switch is disclosed in U.S. Pat. No. 5,796,732 to Mazzola for an Architecture for an Expandable Transaction-Based Switching Bus, which patent is hereby incorporated by reference as though fully set forth herein.

In addition to rendering the forwarding decision, the forwarding engine may then search the forwarding table for a source MAC address of the frame and if that address is not in the table, the forwarding engine "learns" that address. For example, if the source MAC address of the incoming frame is A and that address is not in the forwarding table, the forwarding engine learns the source address of that frame in a conventional manner. When a subsequent frame is received at the switch from another source B which has a destination address of A, the forwarding engine may then be able to properly forward that frame to the destination.

The performance of such a bus-based network switch may be improved by incorporating the ports and forwarding engine circuitry within a line card. A plurality of line cards may then be interconnected by a conventional switch fabric to provide a line card-based network switch. FIG. 3 is a schematic block diagram of a network switch 300 comprising a plurality of line cards (LC1–3) interconnected by a switch fabric 350. It is desirable to have the network switch 300 behave similarly to that of the network switch 200, but operate substantially faster. Such behavior includes learning the source MAC address of the frame received at a port of a line card and ensuring that a frame received at any other port in the network switch may be properly forwarded throughout the switch based on the previously learned source MAC address. Performance improvement of the switch is accomplished, in part, by providing distributed forwarding tables to the line cards of the network switch; however, such an arrangement results in inherently inaccurate forwarding decision behavior.

Assume that an incoming frame is received at port 0 (P0) on line card 1 (LC 1) from source station A and is destined to station B attached to port 1 (P1) on LC1. Here, the location of station B has been learned by the forwarding engine of line card 1 (FE1) and stored in its forwarding table (FwdT1); for example, station B is represented in an entry of FwdT1 as B:1,1. The incoming frame from station A is then forwarded to P1 on LC1 in accordance with a forwarding decision rendered by FE1 and is transmitted to station B. The FE1 also learns the location of station A and stores that location in FwdT1 as A:1,0. As a result of the forwarding decision process, the frame received from station A is transmitted to station B solely within LC1; that is, the frame does not pass through the switching fabric to any other line card of the network switch, thereby increasing performance.

Assume now that an incoming frame is received at P2 of line card 2 (LC2) from a station C and is destined for station A attached to P0 of LC1. The MAC address of A was learned by FE1 during the previous forwarding decision operation; however, the forwarding engine of line card 2 (FE2) never processed ("saw") the frame from station A and thus has not learned the location of A. Accordingly, FE2 "floods" the frame from station C over the switch fabric to all line cards throughout the network switch. This situation manifests a problem within a distributed forwarding table architecture; namely, the fact that the distributed forwarding tables may not have the same information, and thus are not synchronized, because they do not see the same frame traffic throughout the switch.

One way to synchronize distributed forwarding tables in such a network switch is through the use of software executing on a microprocessor ($\mu p$) on each line card. In this approach, the microprocessor is notified each time the forwarding engine learns a new address; the microprocessor then notifies its peer microprocessor on each line card (e.g., over an independent control bus) such that each processor can populate its associated forwarding table with the learned information. A problem with this approach involves the latency associated with updating each of the distributed forwarding tables, along with the additional overhead consumed by the microprocessors when communicating among themselves to populate their forwarding tables with the updated information. The present invention is generally directed to a technique for efficiently and quickly synchronizing the distributed forwarding tables of forwarding engines contained within line cards of a network switch and, further, for maintaining such synchronization in a dynamic (e.g., changing of stations attached to the ports) or lossy (e.g., dropping of packets in the switch fabric) configuration.

The discussion above primarily involves layer 2 (L2) forwarding decision operations; the present invention is also directed to "higher-layer" forwarding/routing operations and, in particular, layer 3 (L3) shortcut and layer 4 (L4) forwarding operations. FIG. 4 is a schematic block diagram of a network switch 400 coupled to a router 450 via port R and to end stations A and B via ports A and B, respectively. Assume end station A is on a different subnetwork (e.g., subnet A) than end station B (e.g., subnet B) and that the two end stations want to communicate; assume further that the ports are configured as virtual local area networks (VLANs), each of which corresponds to the different subnet. In VLAN compatible networks, various LANs, end stations or communication links may be virtually segregated into a series of network groups by associating switch or other device ports with various VLAN designations. Suitable VLAN arrangements are described in the IEEE standard 802.1Q for Virtual Bridged Local Area Networks and in U.S. Pat. No. 5,394,402 to Ross for a Hub for Segmented Virtual Local Area Network with Shared Media Access.

End station A sends a first frame to the network switch 400 where, in response to a forwarding decision, the frame is forwarded to the router 450. The router performs a L3 or L4 forwarding operation on the frame that includes rewriting the MAC (L2) header of the frame and thereafter "routing" the frame onto a different VLAN or subnet to destination station B. In accordance with the L3 shortcut technique, the switch observes the flow of the frame to and from the router and learns the L3 flow information associated with the frame (which does not change during the routing operation) as the frame flows to the router, while also learning the new MAC header associated with frame (which changes after the routing operation) as the routed frame flows from the router.

Specifically, the switch observes the transformation of the frame/packet passed up a protocol stack (such as stack 125)

from the data link (L2) layer to the internetwork (L3) layer of the router, where a routing decision is rendered using, e.g., an IP destination network address in accordance with the IP network protocol, and coming back down the stack so as to acquire sufficient information to route the frame. The switch records ("learns") the IP logical addresses and other information provided to the router within the L3 header of the frame for storage in a L3 entry of its forwarding table, and subsequently learns the route by essentially comparing the L2 information contained in the routed frame with the information stored in the original L2 header of the frame, and noting the differences.

Thereafter, frames of the same type are not passed to the router. That is, a subsequent frame issued by end station A is examined by the switch and if it includes the learned L3 information and is destined for the router, the switch rewrites the MAC header with the learned L2 information (stored in its L3 portion of the forwarding table) from the previous frame in accordance with a L3 shortcut operation that effectively by-passes the router. Thus, L3 processing still occurs when the switch routes similar type frames from subnet A to subnet B, but that processing is implemented in hardware on the switch. An example of a shortcut technique that may be advantageously used with the present invention is described in the commonly assigned U.S. patent application Ser. No. 08/951,820, filed on Oct. 14, 1997 and titled Method and Apparatus for Implementing Forwarding Decision Shortcuts at a Network Switch by Ray Kloth et al., issued on Nov. 14, 2000 as U.S. Pat. No. 6,147,993.

The operation described above is generally the same for a L4 forwarding decision rendered by the router 450 with the exception that the resulting L4 decision is populated within a L4 entry of the forwarding table by the router software, rather than by the "learning" technique. Here, the router may perform a forwarding decision using information stored in a L4 header (e.g., TCP destination port number) of the first frame/packet. Yet instead of the switch 400 learning that L4 decision through the short-cut operation described above, the router 450 "explicitly" populates the L4 portion of the forwarding table with the L4 decision information. In other words, if a subsequent frame issued by an end station and destined for the router includes the relevant L4 information, the switch rewrites the MAC header with the L2 information from the previous frame (which is stored in its L4 portion of the forwarding table) in accordance with a L4 forwarding operation that effectively by-passes the router.

In FIG. 4, the router is externally coupled to the switch; however, the L3 shortcut operation described above may also apply to an embodiment of a platform wherein the router is internally connected (i.e., within the same chassis) to the network switch. Therefore, the present invention is further directed to synchronization of forwarding tables pertaining to L3/L4 operations and, in particular, to shortcuts associated with L3 switching operations and forwarding associated with L4 switching operations in a distributed network switch having a router coupled (either internally or externally) to the switch.

SUMMARY OF THE INVENTION

The invention relates to a mechanism and technique for updating and synchronizing forwarding tables contained on line cards that are interconnected by a switch fabric of a distributed network switch. The network switch is preferably a L3 or L4 switch comprising a plurality of forwarding engines distributed among the line cards. Each forwarding engine has an associated forwarding table, which preferably includes a L2 portion, a L3 portion and/or a L4 portion. The L2 portion of the table is used to execute forwarding decision operations for frames forwarded among ports of the line cards, whereas the L3/L4 portions of the table are used to execute shortcut/forwarding operations for frames routed among the ports. Broadly stated, the mechanism comprises a media access control (MAC) notification (MN) frame for updating and synchronizing the location of a destination port, i.e., the destination index (DI), stored in the L2 portions of the forwarding tables.

In the illustrative embodiment, the switch fabric is embodied as a cross-bar switch configured to interconnect a plurality of serial channel port interfaces to establish point-to-point wire connections for switching frames among the line cards of the switch. The port interfaces are used to implement an extended switching operation between the line card (i.e., the ingress card) having an incoming port that received a frame from a source station on a computer network and the line card (i.e., the egress card) having an outgoing port to which the frame is switched for delivery to a destination station of the network. The frame is preferably a fabric frame having a fabric header that includes a port-of-exit (POE) mask field, a source index field and a destination index field. The POE mask field includes a plurality of bits, one for each port interface of the switch fabric.

When a frame is received at an ingress card, the forwarding engine associated with that line card performs a forwarding decision operation using a destination MAC address of the frame. If the frame is received at the ingress card for the first time, this ingress forwarding engine also "learns" a source MAC address of the frame. Learning an address comprises, inter alia, creating/updating an entry of the L2 forwarding table with the source MAC address and its location (index) within the switch. The ingress forwarding engine then performs a flood-to-fabric (FF) operation on the frame by asserting all bits in the POE mask field of the fabric frame. The asserted POE bits instruct the switch fabric to switch ("flood") copies of the fabric frame through its port interfaces to all (egress) line cards of the network switch. The FF operation essentially forces each forwarding engine associated with each egress card to either (i) update its current L2 forwarding table entry with the newly-learned source MAC address and index of the frame or, if there is not a current entry, (ii) learn the source address/index of the frame.

According to the present invention, the novel MN frame is provided to complement the FF operation. The MN frame comprises, inter alia, a destination MAC address field, a source MAC address field, a source index field and a destination index field. The MN frame may comprise either a positive MN frame or a negative MN frame, each of which involves use of a primary input (PI) indicator. The PI indicator, which may comprise either a single bit or a plurality of bits, denotes a primary input MAC address that is directly attached to a port of the line card associated with the forwarding table containing this entry. That is, the PI indicator is asserted for a forwarding table entry having a MAC address that is learned from a frame sourced through one of the ports of the line card, as opposed to being learned through the switch fabric. As described herein, the forwarding engine on the egress card issues the MN frame to the ingress card, thereby forcing the forwarding engine on that latter card to update its forwarding table with the contents of the MN frame.

The positive MN frame is employed when the PI indicator is asserted for a destination MAC address entry of the forwarding table on the egress card and the DI contained in the switched fabric frame (i.e., the ingress DI) is different from the DI stored in the egress forwarding table (i.e., the egress DI). In the illustrative embodiment, the positive MN frame may also be generated by the forwarding engine on the egress card in response to assertion of a shortcut (SC) bit in a routed frame received at that card. Assertion of the SC bit denotes that the frame was routed through the switch. In order to ensure the consistency of the forwarding tables in the switch, the egress forwarding engine notifies the ingress forwarding engine as to the location of the destination MAC address using the positive MN frame.

Upon receiving the MN frame from the egress card, the ingress forwarding engine establishes or updates an appropriate entry in the L2 portion of its forwarding table using the contents of the source MAC address and source index fields of the MN frame. Notably, the contents of the source index field reflect the port and line card originating the MN frame, i.e., the outgoing port on the egress card. Accordingly, the ingress forwarding engine uses the source index of the MN frame as the destination index for the entry created in its L2 forwarding table.

In contrast, the negative MN frame is used when the PI indicator is not asserted for a destination MAC address entry of the egress forwarding table and the ingress DI is not the same as the egress DI. That is, when the egress forwarding engine receives a frame, it performs a "look-up" into its forwarding table for an entry having the destination MAC address of the frame. If the PI indicator is not asserted for that entry, the egress forwarding engine "knows" that the destination MAC address is not attached to a port for which it is responsible; therefore, the ingress forwarding table (i.e., the forwarding table associated with the line card from which the frame was forwarded) must have incorrect information stored therein. As a result, the egress forwarding engine generates the negative MN frame with the contents of the source index field set to "flood" and sends the frame to the ingress card. Upon receipt of the negative MN frame, the ingress forwarding engine learns "flood" as the destination index for the destination MAC address entry and thereafter performs a flood-to-VLAN (FV) operation for a frame having the destination MAC address.

Advantageously, the novel MN frame mechanism enables efficient and prompt synchronization of L2 forwarding tables in the distributed network switch. L2 synchronization is required to support higher layer, e.g., L3, L4 or layer 7 (application), forwarding operations that may be distributed throughout the switch.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 7 is a highly schematic block diagram of a local target logic memory having a plurality of entries, each of which includes a port select signals and a port-of-exit bit vector; and FIG. 8 is a schematic block diagram of a media access control (MAC) notification frame used to notify a forwarding engine as to the location of a port associated with a destination MAC address in accordance with the present invention.

DETAILED DESCRIPTION OF AN ILLUSTRATIVE EMBODIMENT

Figure 1:
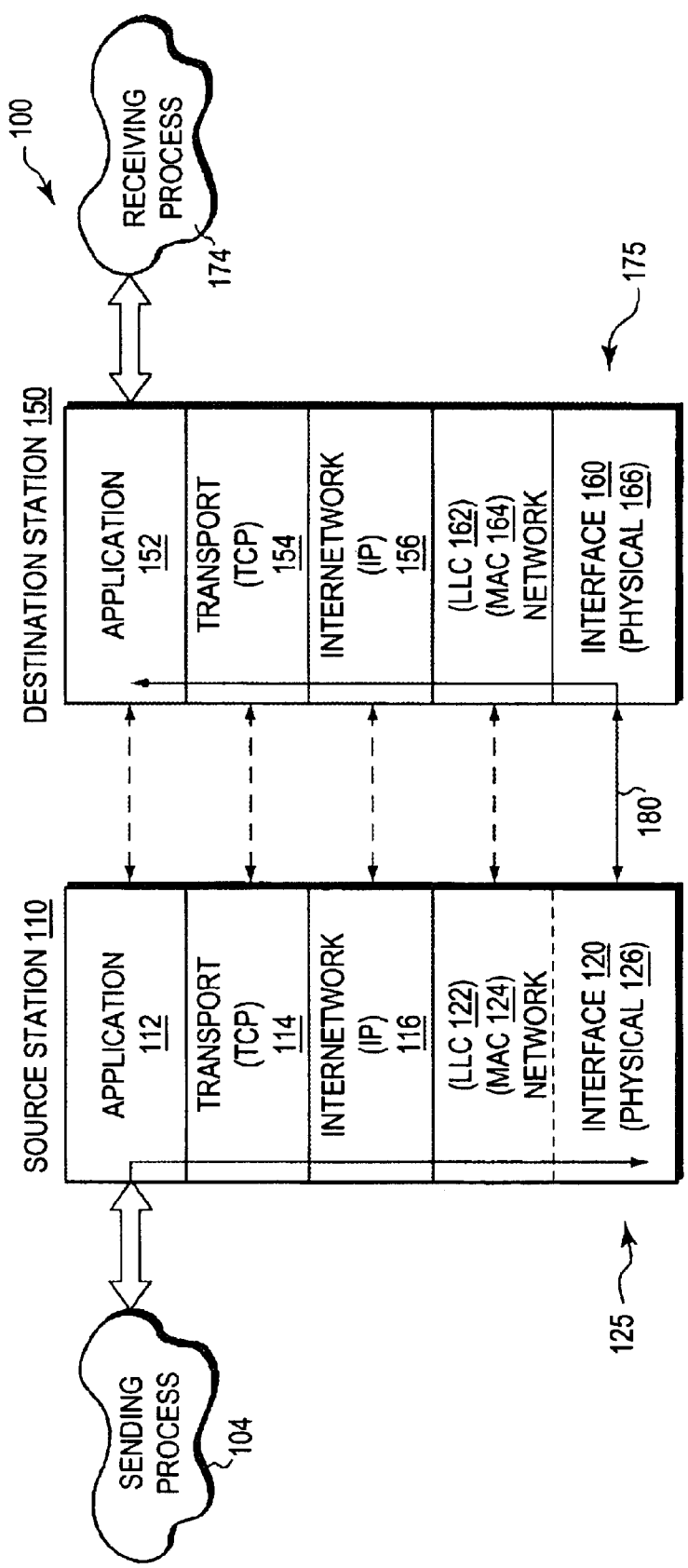
FIG. 1 is a schematic block diagram of prior art communications architecture protocol stacks used to transmit data between stations of a computer network.
Figure 2:
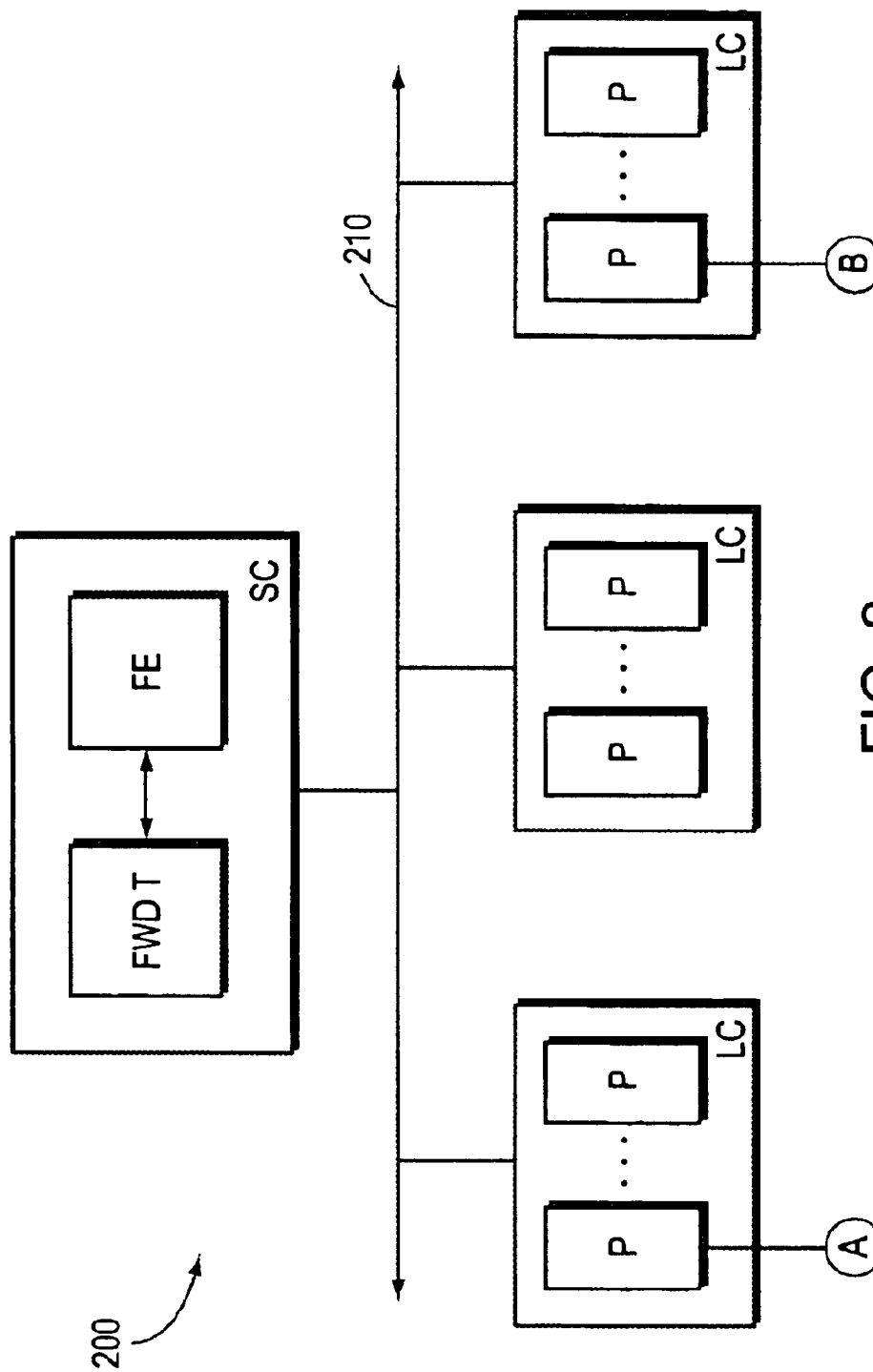
FIG. 2 is a highly schematic block diagram of a conventional bus-based network switch comprising a plurality of ports coupled to forwarding engine circuitry.
Figure 3:
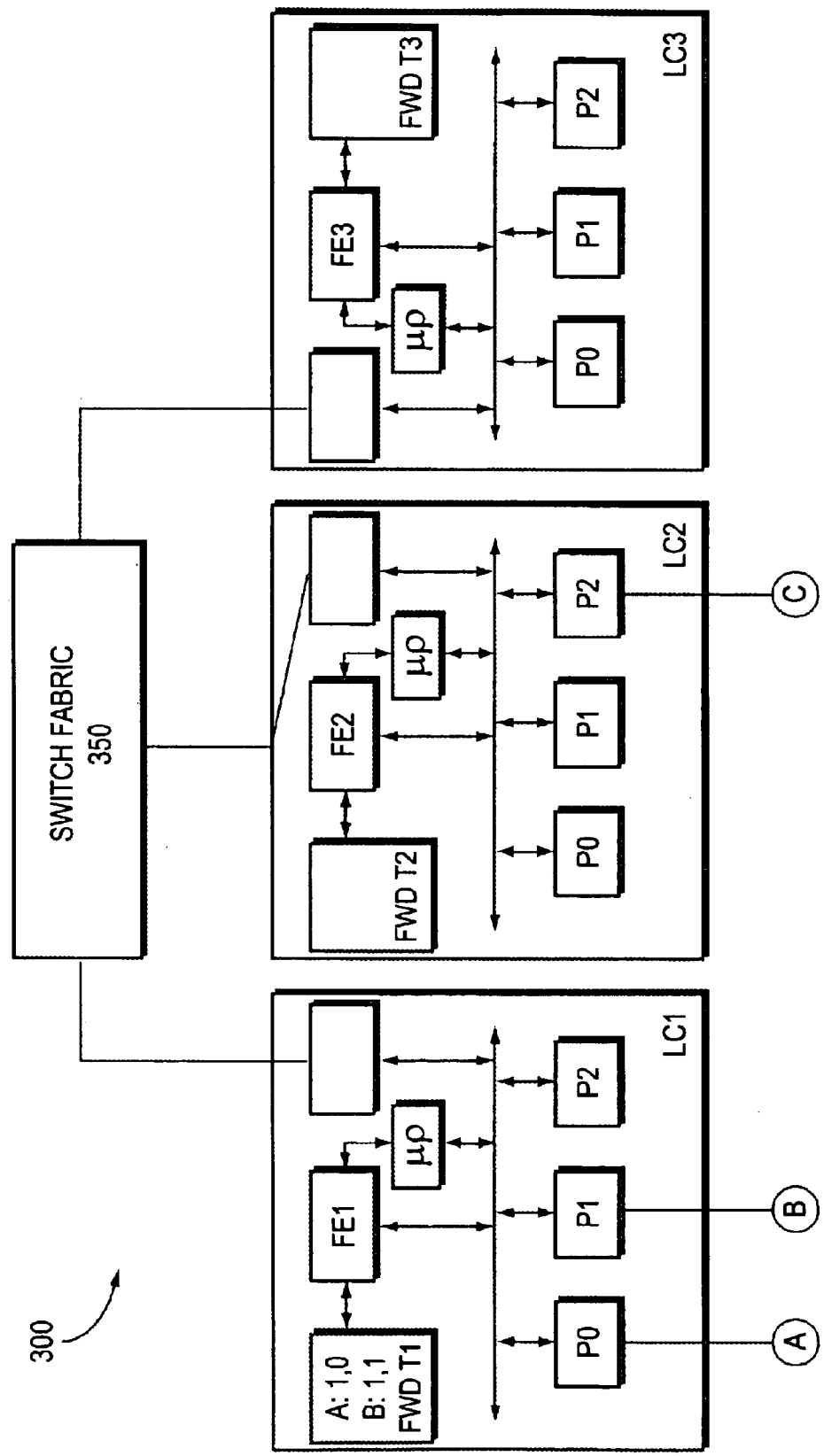
FIG. 3 is a schematic block diagram of a network switch comprising a plurality of line cards interconnected by a switch fabric, wherein each line card incorporates the ports and forwarding engine circuitry of FIG. 2.
Figure 4:
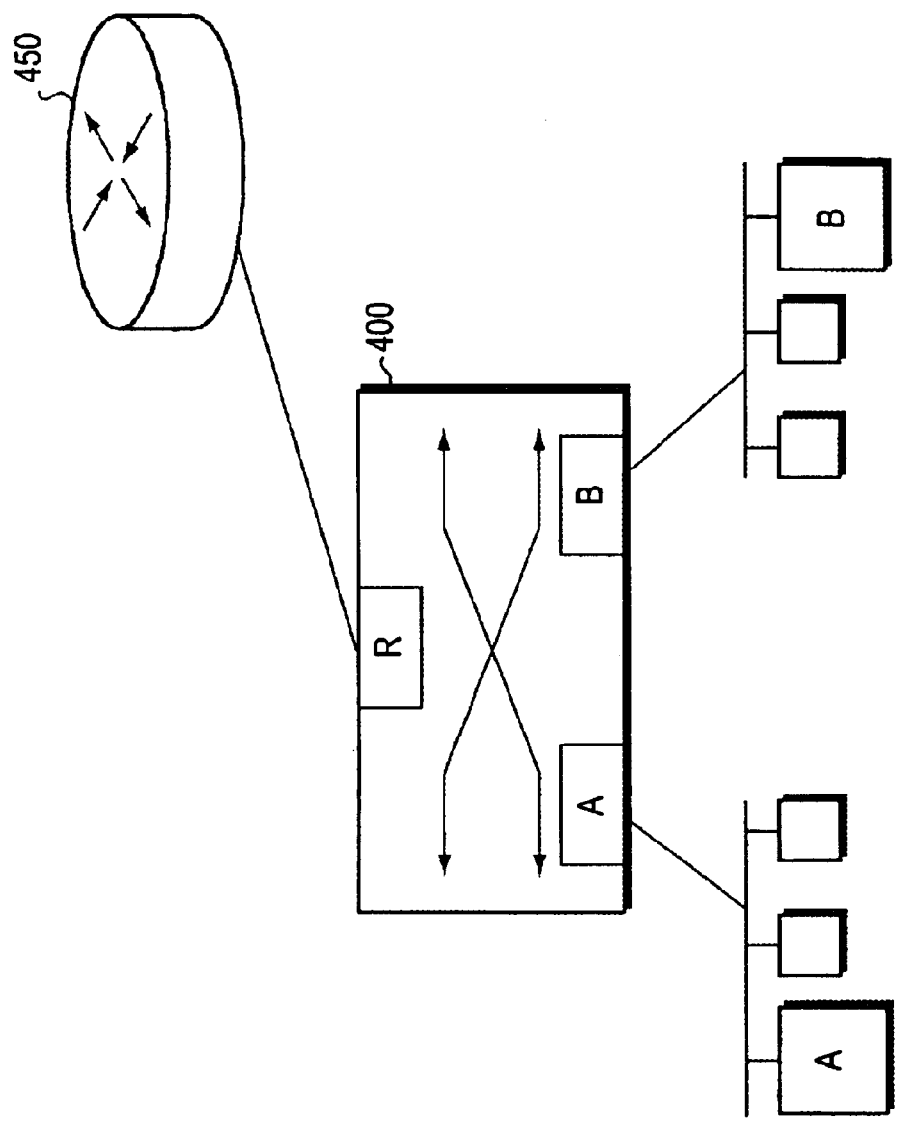
FIG. 4 is a schematic block diagram of a network switch coupled between a router and a plurality of end stations, each of which is attached to a subnetwork.
Figure 5:
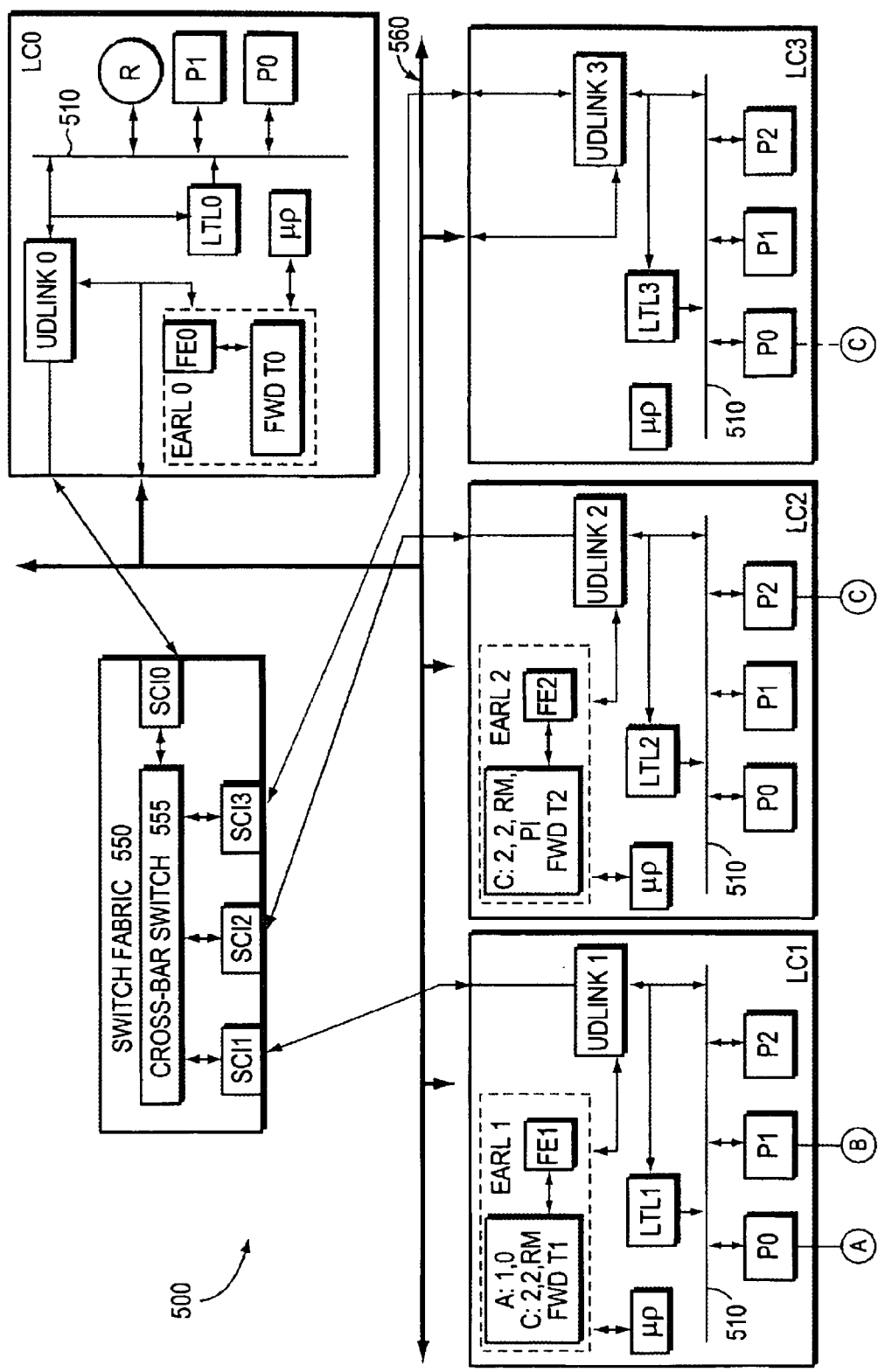
FIG. 5 is a schematic block diagram of a network switch having a software routing component and hardware forwarding engine components distributed among a plurality of line cards that are interconnected by a switch fabric.

FIG. 5 is a schematic block diagram of a network switch 500 that may be advantageously used with the present invention. The network switch is preferably a layer 3 or a layer 4 switch having a software routing component and hardware components distributed among a plurality of line cards (LC0–3) that are interconnected by a switch fabric 550. The network switch may be embodied as a chassis with a backplane of wires having a plurality of connectors for receiving the line cards. One of the line cards, denoted LC0, is a switch management card (SMC) that includes an internal router (R) of the switch. References herein to the internal router are directed to the software routing component, which is preferably a routing process executing in the internetwork layer (layer 3) or transport layer (layer 4) of a conventional protocol stack.

Each line card comprises a plurality of ports P (e.g., P0–P2), a local target logic (LTL) memory and an up/down link (UDlink) interface circuit interconnected by a local bus 510. Each line card further contains a microprocessor (IP) that is preferably in communicating relation with all of its "peer" microprocessors in switch 500 over a management bus (not shown). The microprocessor may comprise processing elements or logic for executing software programs and/or manipulating data structures associated with the inventive technique described herein.

In the illustrative embodiment, some of the line cards may comprise self-contained "mini-switches" that are capable of rendering forwarding decision operations for data frame traffic switched by the fabric 550; that is, forwarding decisions implemented by the switch fabric may be provided by some line cards. Each of these cards includes an encoded address recognition logic (EARL) circuit coupled to the UDlink and microprocessor. The EARL executes all forwarding decisions for its associated line card(s), while the LTL implements those forwarding decisions by selecting ports as destinations for receiving data frames transferred over the local bus. To that end, the EARL contains circuitry (hereinafter "forwarding engine circuitry") and at least one forwarding table (FwdT) configured to produce a unique destination port index value, as described below.

Inputs to the LTL logic are received over the local bus 510, which is driven by the UDlink. The local bus 510 preferably comprises a first bus part that is driven by a source of data; in the illustrative embodiment, the source may comprise a port P, the router R or the UDlink. A second part of the bus 510, called the result bus, is driven by the UDlink on behalf of the EARL. By employing the UDlink in this manner, a line card (e.g., LC0–2) may include both an EARL circuit and a UDlink or it may share the EARL contained on another line card. In this latter case, a common bus 560 enables a line card without a forwarding engine (e.g., LC3) to use the forwarding engine (e.g., EARL 0) on another line card, such as the SMC. When EARL is installed on a line card, however, that card does not use the common bus 560.

The forwarding engine circuitry (FE) determines actions to be taken on frames passing through the switch by accessing and processing information stored in the forwarding table and drives the results of those actions over the result bus. In essence, the forwarding rate of data throughout the network switch 500 is the sum of the forwarding rates of the forwarding engines of the line cards in the switch. This enables the architecture of the network switch to scale with the addition of hardware (line cards). The forwarding engine is preferably implemented in hardware as a plurality of registers and combinational logic configured to produce sequential logic circuits and cooperating state machines.

The forwarding table contains a plurality of entries, each of which is accessed by, e.g., a destination media access control (MAC) address and a source (ingress) virtual local area network (VLAN) identifier (ID) of a frame. Each entry contains, inter alia, a port index field whose contents function as a pointer into the LTL memory. The LTL is preferably organized as a table structure having a plurality of entries used to translate the port index into a set of port select signals for each port on the line card associated with the LTL and a port-of-exit (POE) bit vector for the switch fabric.

Each port P of the switch is controlled by port interface circuitry coupled to a frame buffer (not shown). The port circuitry provides MAC and direct memory access (DMA) capabilities for the switch. The DMA capability provides buffer management of the frame buffer and an interface to the local bus, while the MAC capability allows attachment of the switch to a network entity. The network entity may comprise a processor or similar circuit that interfaces with network media, such as Ethernet, FDDI or Token Ring connections.

Each port P of the network switch is further assigned a unique port index value that is mapped to a destination MAC address by the EARL. The port index value becomes a destination index when there is a "hit" in the forwarding table; the destination index is then used to reference an entry of the LTL. Each entry of the LTL contains (i) port select signals indicating which port(s) should receive the frame and (ii) a POE bit vector instructing the switch fabric as to which line cards (if any) should receive the frame. Examples of an EARL circuit, including a forwarding engine and forwarding table, an LTL and port interface circuitry that may be advantageously used with the present invention are disclosed in U.S. Pat. No. 5,740,171, by Mazzola et al. and titled Address Translation Mechanism for a High-Performance Network Switch, which patent is hereby incorporated by reference as though fully set forth herein.

The switch fabric 550 is preferably a switching matrix employed to control the transfer of data over the backplane and among the cards inserted into the connectors. To that end, the switch fabric comprises circuitry contained on, e.g., a single card plugged into a connector of the chassis backplane. Specifically, the switch fabric 550 includes a plurality of serial channel interface (SCI0–3) ports that are interconnected by, e.g., a cross-bar switch 555 that establishes a point-to-point wire connection between a source and destination card over the backplane. Moreover, each SCI port comprises logic circuitry configured to forward a frame from an inbound SCI port to one or more outbound SCI ports through the cross-bar switch 555. Buffers (not shown) may be provided on the fabric 550 for temporarily storing frames until they are accepted by the outbound ports.

The UDlink is preferably an application specific integrated circuit comprising a plurality of registers and combinational logic for performing operations on various data structures used with the present invention. In addition, the UDlink generally provides an electrical/mechanical interface between the local bus 510 on each line card and the switch fabric 550. For those line cards without a forwarding engine, the UDlink also provides a connection to the common bus 560; however if the line card has a forwarding engine, the UDlink connects directly to the EARL on that card.

Moreover, the UDlink provides some degree of buffering of frames destined for the switch fabric. The format of data between each line card and the switch fabric is generally similar to that employed over the local bus. For example, the frame format of data transferred from each line card to the switch fabric includes bit mask information instructing the switch fabric 550 where to forward the frame; this bit mask information, which is also included on frames traversing the local bus 510, is embedded within a header of each frame. These frames are generally referred to hereinafter as fabric frames.

Figure 6:
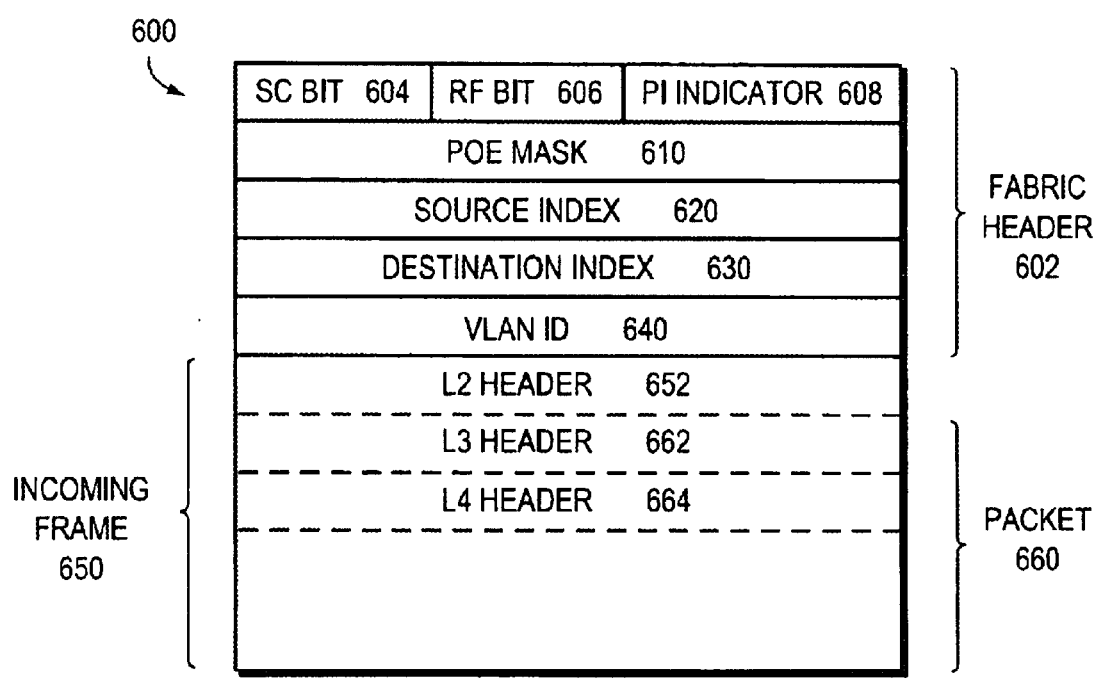
FIG. 6 is a highly schematic block diagram of a format of a fabric frame that is transferred between the line cards and switch fabric in accordance with the invention.

FIG. 6 is a highly schematic block diagram of a format of a fabric frame 600 in accordance with the present invention. The fabric frame 600 comprises an incoming frame 650 having a layer 2 (L2) MAC header 652, and an encapsulated packet 660 having a layer 3 (L3) header 662 and a layer 4 (L4) header 664. The incoming frame 650 is appended to a fabric header 602 that includes a POE mask field 610, a source index field 620, a destination index field 630 and a VLAN ID field 640. The POE mask field 610 preferably includes a plurality of bits, one for each SCI port of the switch fabric 550. The header 602 also includes a shortcut (SC) bit 604, a routed frame (RF) bit 606 and a primary input (PI) indicator 608, the latter of which is preferably a 4-bit field used to, e.g., identify which EARL circuit rendered a forwarding decision of the frame.

Broadly stated, portions of the fabric frame 600 are generated by port circuitry of an ingress card in response to processing an incoming frame received at the switch 500. When the incoming frame arrives at the port, it is loaded into the frame buffer associated with the port interface circuitry. Once the frame is completely received, the port circuitry processes the incoming frame by, inter alia, generating the POE mask field 610 and initially setting its bits to null (logical "0"); the states of these POE bits are initially null because it is undetermined at that time whether the frame will be forwarded to the switch fabric 550. In addition, the port circuitry loads its own index (the source index) into the source index field 620 of the fabric frame 600 and then drives ("sources") the frame over its local bus 510.

As the frame 600 is transferred over the bus, EARL may process the L2 header 652, the L3 header 662 and the L4 header 664 in order to render a forwarding decision for the frame. In response to such processing, the EARL generates an egress VLAN ID and a destination index, the latter of which is driven over the result bus to the LTL which, in turn, generates a POE bit vector along with port select signals of the ports within the line card that are destined to receive the frame. If the ultimate destination of the frame is one or more ports residing solely within the line card, then a local switching operation is performed by driving the port select signals to the ports of the ingress card. However if the ultimate destination resides on another egress line card or if the destination is unknown (thereby causing a "flood" operation), then an extended switching operation is required.

An extended switching operation requires the frame 600 to leave the ingress card, travel through the switch fabric 550 and eventually arrive at one or more egress cards. As a result of the forwarding decision operation at the ingress card, the POE bit vector obtained from the LTL may be associated with a destination accessible through the switch fabric 550. For a frame destined to the switch fabric, the port select signals denote the UDlink as the destination port. Logic circuitry within the UDlink logically combines (e.g., by way of a boolean OR operation) the bits of the POE bit vector with corresponding bits of the POE field 610. These logically combined bits are loaded into field 610 of the fabric frame, while the destination index and egress VLAN ID (obtained from the EARL) are loaded into fields 630, 640 prior to passing the frame 600 to the switch fabric. The switch fabric 550 then uses this information to forward the frame through the switch 555 and onto an egress card attached to the destination station.

In particular, logic circuitry on an inbound SCI port uses the contents of the POE field 610 to forward the frame to the appropriate outbound SCI port(s). Once the frame traverses the fabric and arrives at an egress card, the EARL on the egress card may use the destination index accompanying the frame to drive its LTL directly. The LTL responds to the index by driving the port select signals to all of the ports on the egress card. The frame is accepted by the port interface circuitry attached to the station destined to receive the frame and is finally transmitted over the network to that station.

In the illustrative embodiment, the forwarding table (and LTL) are distributed among all of the line cards. Each forwarding table includes a L2 portion and L3/L4 portions; the L2 portion of the table is used to execute forwarding decision operations for frames forwarded among ports of the line cards, whereas the L3/L4 portions of the table are used to execute L3/L4 shortcut/forwarding operations for frames routed among the ports. The technique described herein populates the L2 portions of the forwarding tables with information pertaining to only those ports about which the forwarding engines associated with those tables require. For example, the forwarding engine of a line card needs to know about all of the ports contained within its line card and contained within other line cards with which it is associated, in addition to those ports on other line cards that receive frames forwarded from any of its ports. A problem solved by the present invention involves synchronization of the forwarding tables, each of which may contain different information as a result of the distributed architecture of the network switch.

The architecture of the network switch supports L2 switching of various frames, such as Ethernet, FDDI and Token Ring frames. As noted, forwarding of frames may occur between ports on the same or different line cards. The destination MAC address and (ingress) VLAN ID of each frame are used to access the forwarding table when "looking-up" the port(s) that should receive the frame. The forwarding table is also used to determine whether the frame should be considered for L3 switching (shortcut), L3routing or L4 forwarding operations. L3 shortcut switching lookup operations occur in parallel with the L2 switching lookup operations so as to not impede performance of the forwarding decision process; moreover, the entire lookup operation in the EARL occurs in parallel with the transfer of the frame over the local bus.

L3 Shortcuts/L4 Forwarding

As described herein, L3 shortcut switching operations are executed as a result of the cooperation between the software and hardware components of the switch. A first frame having a particular L3 flow enters the switch at an ingress card of the switch. A flow is L3 (internetwork layer) information such as, e.g., an IP destination address, IP destination/source pair addresses or IP source/destination pair addresses and protocol port number. If the frame is destined for the router, the software routing component "routes" the frame to the appropriate port of an egress card of the switch. During this process, the hardware component (EARL) "learns" the action taken by the software router in order to perform hardware routing or L3 shortcut operations on subsequent frames having that L3 flow information.

For example, assume an incoming frame 650 is received at port P0 of ingress card LC1 from source A and is destined for destination C attached to port P2 of egress card LC2. The ports of the line cards are configured as VLANs, each of which corresponds to a subnet; thus, P0 of LC1 may be configured as a "red" VLAN and P2 of LC2 is configured as a "blue" VLAN. Since the destination is on a different subnet from the source, the destination MAC (L2) address of the frame is that of the router, while a destination IP (L3) address of the frame is that of destination C. The port interface circuitry of P0 transforms the incoming frame into fabric frame 600, loads the value <1,0> into the source index field 620 along with null values into the POE mask field 610 and destination index field 630, and drives the frame over its local bus 510.

The forwarding engine FE1 renders a forwarding decision for the frame by, inter alia, looking-up the destination MAC address in the L2 portion of its forwarding table FwdT. The L2 lookup operation results in a destination index of <0,0> being provided by FwdT1, which index denotes the router coupled to P0 of LC0 (the SMC). FE1 also checks the L3 portion of the forwarding table to determine whether a shortcut entry exists for the frame. If one exists, a rewrite destination MAC address and an egress VLAN ID are retrieved from the L3 shortcut entry and provided to the L2 portion of the FwdT1 where, inter alia, the location (index) of the rewritten destination address is determined. Thus, the result of the L3 table lookup is used to modify the frame, while the result of the L2 table lookup is used to direct the modified frame to its destination.

In the case of a L4 forwarding operation, a 5-tuple lookup is performed by FE1 using the L4 portion of the forwarding table to determine whether an entry exists for the frame. A "5-tuple" lookup is well-known nomenclature used in, e.g., IETF Standard RFC 792 to describe L3 and L4 information that uniquely defines a connection between two hosts in a TCP/IP or UDP/IP environment. The 5-tuple comprises (i) a source IP address, (ii) a destination IP address, (iii) a protocol type, (iv) a layer 4 source port number, and (v) a layer destination port number. If a L4 forwarding entry exists, a different rewrite destination MAC address and egress VLAN ID may be retrieved from the L4 entry and provided to the L2 portion of the FwdT1. If the L4 entry does not exist, an entry is created in the L4 portion of the forwarding table and the frame is forwarded to the router on the SMC, which performs the L4 routing operation and thereafter explicitly populates the L4 portion of FwdT1.

Referring again to the shortcut operation, if a L3 shortcut entry does not exist in the L3 portion of FwdT1, an entry is created in that portion of the table and the frame is forwarded to the SMC for routing as a candidate frame. Prior to forwarding the frame to the SMC, FE1 learns the L3 flow of the candidate frame and loads this information into the newly created entry. The destination index <0,0> is then driven over the result bus 520 to LTL1 and is used as the basis of a look-up into that memory. FIG. 7 is a highly schematic block diagram of an LTL memory 700, e.g., LTL1, having a plurality of entries 710 accessed by port/line card indexes. Each entry 710 includes a port select field 720 having a plurality of port select bits/signals and a POE vector field 730 having a plurality of POE mask bits. The port select signals for an entry <0,0>, i.e., the router entry, of the LTL1 are <0001> which specify the UDlink1 as the interface to the local bus that receives the frame 600. Moreover, the states of the POE vector bits are <1000>, which preferably specify SCI0 as the destination port interface of the switch fabric 550.

The UDlink1 logically combines the bits of the POE mask with corresponding bits of the POE field 610, and then loads the destination index value <0,0> and the egress VLAN ID into the fields 630, 640 of the frame 600 prior to forwarding the frame to the switch fabric. As a result of the UDlink processing, the states of the POE bits in field 610 are <1000>. Upon receiving the frame 600, SCI1 on the switch fabric 550 examines the contents of the POE field 610 and switches that frame to the SMC coupled to SCI0.

The UDlink0 on the SMC drives the frame over its local bus 510 where it is received by the router R. Here, the forwarding engine FE0 does not need to access its forwarding table FwdT0 because the destination index <0,0> is already provided in field 630 of the frame 600; therefore, FE0 drives the frame directly to LTL0 which returns a port select signal indicating the router as the recipient of the frame 600. Upon receiving the candidate frame, the router modifies the header 602 of the frame 600 during execution of a routing decision operation to, inter alia, ensure that copies of that frame are provided to the ingress card that received the frame from a source station on a computer network, in addition to the egress card to which the frame is switched for delivery to a destination station of the network.

Specifically, the router R performs a routing operation on the frame that includes rewriting the L2 header, e.g., changing (i) the destination MAC address to destination C, (ii) the source MAC address to R and (iii) the VLAN to the egress VLAN, of the frame and asserting various bits of the fabric header 602, thereby essentially transforming the frame 400 into a routed enabler frame 600. According to a first aspect of a L3 learning and switching technique, the router executes an algorithm that asserts a bit in the POE mask field 610 of the fabric header 602 pertaining to the SCI port on the switch fabric 550 coupled to the ingress card LC1 (as specified by the contents of the source index field 620 of the candidate frame). The contents of the source index field are <LC1, P0> which specifies the source line card and source port of the frame; using this source index, the router sets a POE mask bit <0100> that identifies the appropriate interface on the switch fabric corresponding to that source of the frame.

The router then forwards the frame over its local bus where it is received by FE0, which performs a forwarding decision operation using, inter alia, the rewritten destination MAC address of the frame to access FwdT0. If there is not an entry in the L2 portion of the FwdT0 for destination C, then FE0 floods the frame throughout the network switch. However, if there is any entry for C, a destination index <2,2> is provided to the LTL0 which, in turn, outputs (i) a POE vector <0010> wherein the asserted bit denotes SCI2 port coupled to egress card LC2 and (ii) port select signals <0010> denoting the UDlink0.

The UDlink0 receives the frame 600, logically combines the POE vector bits from LTL0 with the corresponding bits of the POE mask field 610 and forwards the frame 600 onto the switch fabric 550. As a result of the logical "ORing" combination, the contents of the POE mask field 610 comprise <0110>, which instructs the fabric 550 to switch copies of the routed enabler frame through its ports SCI1 and SCI2 coupled to the ingress card LC1 and egress card LC2, respectively. At the egress card LC2, FE2 performs a forwarding decision operation using the rewritten destination MAC address and the egress VLAN ID, which results in the frame being forwarded to P2 attached to end station C.

Meanwhile at the ingress card LC1, FE1 associates the L3 flow learned from the candidate frame with the required L2 header rewrite of the enabler frame and, thus, completes the shortcut entry for the L3 portion of the forwarding table. FE1 then discards the frame because (i) none of the ports on LC1 are the destination of the routed frame and (ii) the destination index of the routed enabler packet denotes LC2 (which requires that the frame be passed again through the UDlink); according to the invention, the UDlink will not forward a frame that it has just delivered to its line card.

Thus, the technique ensures that the forwarding engine on the ingress card "sees" the frame before and after the routing decision is rendered by the router so that L3 learning may occur correctly. For each subsequent frame having the learned L3 flow, EARL looks-up the destination MAC address of the frame in its L3 portion of the forwarding table and sends the corresponding rewrite information over the local bus after the frame. The destination port circuitry (or, alternatively, a UDlink or central rewrite engine) matches the frame with the rewrite information and modifies the frame as needed by replacing, inter alia, the destination and source MAC addresses.

For example, when a subsequent frame is received at LC1 from source A on subnet A and is destined to destination C on subnet C, the FE1 implements the shortcut by first looking-up destination MAC address (R) in its L2 portion of FwdT1. Upon realizing that the frame should be routed, FE1 then performs a look-up into the L3 portion of the FwdT1 using the L3 flow of the frame to determine whether a shortcut entry exists. Since there is an entry for the frame, a rewrite destination MAC address (C) is retrieved from the L3 shortcut entry and provided to the L2 portion of the FwdT1, which outputs an index <2,2> that is driven to the LTL1. The entry <2,2> in LTL1 has an asserted port select signal pertaining to UDlink1, indicating that the frame should be sent to the switch fabric 550. Furthermore, entry <2,2> has a POE vector of <0010> which, after logically combining with the POE field 610, instructs the inbound port SCI1 of switch fabric 550 to switch the frame through outbound port SCI2 and onto LC2. The technique thus bypasses the router and sends the frame directly to the line card associated with the destination of the frame.

Advantageously, the technique enables the EARL associated with an ingress card to learn and update its L3 forwarding table "on-the-fly" to enable efficient implementation of L3 shortcuts in the distributed switch architecture. In the absence of this feature, FE1 would not "see" (process) the routed enabler frame and a shortcut operation cannot be executed by that forwarding engine for subsequent frames issued by station A to station C. In fact, only the SMC could execute the shortcut because FE0 saw both of the candidate and enabler packets. Although a shortcut may be performed by FE0 (thereby obviating the need to send the packet to the router), all routed traffic in the switch 500 would have to be forwarded to the SMC, thereby creating a substantial bottleneck in the switch.

Forwarding Table Synchronization

Assume now that location (index) of destination C is stored in FwdT2 of LC2, but not in FwdT1 of LC1, and that the location (index) of source A is stored in the FwdT1, but not in FwdT2. This situation may arise despite implementation of the shortcut on LC1 which effectively replaces the destination and source MAC addresses of a subsequent incoming frame having a particular L3 flow with information learned during examination of the candidate and enabler frames associated with a previous incoming frame having that flow. For example, this situation may arise where ports of an ingress card have a different VLAN association (and, thus are not in the broadcast domain) from that of the port attached to the destination of the routed frame. The present invention is directed to solving the problem presented by this situation; namely, synchronization of the forwarding tables on the line cards to ensure that an entry having the MAC address associated with the destination of the shortcut is established in the L2 portion of the forwarding table of an ingress card that may not have any ports in a broadcast domain of the destination of the routed frame.

An incoming frame from source A is received at P0 of LC1, transformed into a fabric frame 600 by the port circuitry of P0 and forwarded by FE1 to UDlink1 in accordance with a forwarding decision operation. UDlink1 then forwards the frame to the router by way of the switch fabric as described above. After a routing decision is rendered by the router, the source index field 620 of the frame 600 contains the source index <1,0> of the fabric frame (i.e., P0 of LC1) instead of the source index of the router.

When the router performs a routing decision operation on a fabric frame, it does not modify the contents of the source index field 620. That is, rather than altering the header of the routed frame to indicate that the frame originated from the SMC (as is typical during routing operations), the router maintains the contents of the source index field to specify the incoming port on the ingress card as the originator of the routed frame.

If the ports of the ingress card are not in the broadcast domain of the routed frame, the location of the shortcut may not be known to ("stored in") the L2 portion of the forwarding table on the ingress card. Accordingly, the router also asserts a predefined bit in the fabric header 602 of the routed frame that instructs the forwarding engine on the egress card to generate a novel notification frame that informs a recipient of that frame about the location of a particular L2 address. In the illustrative embodiment described herein, the predefined bit is the SC bit 604 and the notification frame is a MAC notification (MN) frame.

The routed frame 600 is then driven over the local bus of the SMC to UDlink0 and onto the switching fabric, where it is switched through SCI1 and SCI2 of the fabric to LC1 and LC2. At LC1, the shortcut is enabled, as previously described, and at LC2 the frame is forwarded by FE2 to P2, where it is transmitted to destination C. FE2 also examines the routed frame to determine the states of the SC bit 604 and the RF bit 606. Assertion of the SC bit means that the frame was routed by the software router and that a L3 shortcut may be enabled in the network switch, whereas assertion of the RF bit means that the frame was routed somewhere within the switch 500. That is, the SC bit 604 is asserted whenever the software component of the switch routes the frame, whereas the RF bit 606 is asserted whenever any component (hardware or software) within the switch routes the frame. Thus if the RF bit is asserted but the SC bit is not, a hardware component (such as a forwarding engine on a line card) executed a shortcut to route the frame.

When the routed enabler frame 600 arrives on the local bus of LC2, a forwarding decision is rendered by FE2 using the contents of the destination index field 630 to forward the frame to the appropriate port (P2) and onto destination C. The FE2 uses the destination MAC address and VLAN ID of the frame to look-up the destination index stored in FwdT2 to determine whether it matches the destination index loaded into field 630. If they match, FE2 then examines the state of the SC bit 604 and if it is asserted, FE2 knows that the frame was routed by the router of the switch. According to the invention, FE2 (the destination forwarding engine of the routed fabric frame) notifies the source forwarding engine of the frame (denoted by the source index) as to the location of the destination MAC address C.

Specifically, the destination forwarding engine notifies the source forwarding engine as to the location of the destination MAC address via the MN frame. FIG. 8 is a schematic block diagram of the MN frame 800 comprising a plurality of fields including a POE field 802, a destination index field 804, a source index field 806, a VLAN ID field 816, a destination MAC address (DA) field 808 and a source MAC address (SA) field 810. The contents of the destination index field 804 specify the destination of the frame 800 and thus should (but may not) correspond to the contents of the DA field 808. Similarly, the contents of the source index field 806 specify the source of the frame and thus should correspond to the contents of the SA field 810. The MN frame further includes a "don't forward" (DF) bit 812 and the RF bit 814. Assertion of the DF bit 812 specifies forwarding of the frame only through the switching fabric and, notably, not through the ports on a line card.

Essentially, the contents of the DA field 808 are the contents of the source MAC address field of the routed enabler frame and the contents of the SA field 810 comprise the contents of the destination MAC address field of that frame. Moreover, the contents of the destination index field 804 and the source index field 806 of the MN frame 800 comprise the contents of the source index field 620 of the enabler frame 600 and the destination index field 630 of the egress forwarding table, respectively. Since the contents of the destination index field 804 may not correspond to the contents of the destination MAC address field 808, the MN frame 800 is index-directed which denotes use of the destination index when forwarding the frame, as opposed to looking-up the destination MAC address in a forwarding table.

Since the MN frame is generated in response to assertion of the SC bit in the routed frame, the contents of the destination index field associated with the destination MAC address reflect the port and line card originating the routed frame, i.e., the incoming port on the ingress card; accordingly, the MN frame is issued from the egress card (LC2) to the ingress card (LC1). In this embodiment, FE2 drives the MN frame 800 over its local bus where it is accepted by UDlink2 and passed through the switch fabric to LC1. The UDlink1 drives the MN frame 800 over the local bus of LC1 where none of the ports accept the frame because the DF bit 812 is asserted.

However, in accordance with the invention, FE1 accepts the MN frame 800 and learns that the source MAC address C of the frame 800 is associated with the source index <2,2> of that frame. The forwarding engine FE1 uses this information to populate its FwdT1; that is, FE1 establishes an appropriate entry in the L2 portion of its forwarding table using the contents of the source MAC address and source index fields of the MN frame, the latter of which reflects the port and line card originating the MN frame, i.e., the outgoing port P2 on the egress card LC2. The MN frame 800 is "proactively" generated in response to the routed enabler frame being received at the destination LC2 and in sequence such that FwdT1 is populated (i.e., synchronized with FwdT2) prior to subsequent frames being received at LC1 from source A. Synchronization of the forwarding table FwdT1 is required to ensure that a shortcut is properly executed by LC1 for the subsequent frames.

In accordance with the invention, the novel MN frame 800 provides a means for synchronizing the L2 portions of the forwarding tables that are distributed throughout the network switch to thereby enable implementation of L3 shortcuts. It should be noted that L2 synchronization is required to support higher layer, e.g., L3, L4 or layer 7 (application), forwarding operations that may be distributed throughout the switch. For example when a subsequent frame is received at LC1 from source station A, FE1 looks-up the destination address of the frame in its L2 portion of FwdT1 and determines that it is the address of the router. The FE1 then accesses the L3 portion of FwdT1 to determine the re-write destination MAC address associated with the router. FE1 thereafter uses the rewrite destination MAC address to access (again) the L2 portion of the FwdT1 to determine which port on which line card (the destination index) should receive the shortcutted frame.

As noted, assertion of the SC bit 604 instructs a forwarding engine to generate the MN frame 800 and send it to the line card that "sourced" the candidate frame/packet. According to the technique described herein, the forwarding engine may also send a copy of the MN frame to the SMC to ensure that FwdT0 is synchronized. That is, the MN frame is sent to the router in response to assertion of the SC bit (which can only be asserted by the router). To that end, FE2 also asserts an appropriate bit of the POE field 802 that specifies the router when generating the MN frame. The POE field bits are logically combined (ORed) with the POE mask bits provided by LTL2 at the UDlink2 such that the MN frame is sent to two different locations (the SMC and LC1).

Aging

The technique described herein is also directed to aging of entries in the forwarding tables of the distributed switch. Broadly stated, a MAC address entry that has not been refreshed as a source within a specified period of time is removed from the L2 portion of the forwarding table in connection with a conventional aging policy executed by the microprocessor on the line card. However, the MAC address associated with the source index learned by the forwarding engine of the ingress card may never be a source of a frame received at the ingress card. Accordingly, the aging policy will eventually age-out the entry associated with that MAC address which, in turn, will inhibit execution of a L3 shortcut operation at the ingress card. The technique described herein provides a means of marking such an entry so that it is not aged according to the conventional aging policy.

Specifically, if the RF bit 606 is asserted in a frame 600 whose MAC address is being learned by a forwarding engine, that RF bit is copied into the entry of the L2 portion of the forwarding table associated with that MAC address as a "routed MAC" address (RM) bit. According to the technique, the RM bit instructs the microprocessor not to remove the entry as part of the normal aging policy. It should be noted that the state of the RF bit 814 in the MN frame 800 is the same as that of the RF bit 606 contained within the routed enabler frame 600. If the frame 600 is routed by any entity of the switch during any processing within the switch (e.g., during a shortcut), then the RF bit 606 is asserted.

Once the RM bit is set for an entry of a forwarding table, the aging policy may never age that entry; yet, there may be a situation where the entry should be aged (for example, if the end station of the MAC address is disconnected). To solve this problem, the invention provides either a single bit or a plurality of bits hereinafter referred to as the PI indicator. The PI indicator denotes a primary input MAC address that is not only a routed MAC (RM) address, but is also directly attached to a port of the line card associated with the forwarding table containing this entry. That is, the PI indicator is asserted for a forwarding table entry having a MAC address that is learned from a frame sourced through one of the ports of a source line card associated with a particular forwarding engine (as opposed to being learned through the switching fabric). For example if the RF bit 606 is asserted within the frame 600 when FE2 generates the MN frame 800, it asserts the RM bit of the MAC address C entry in FwdT2. Moreover if the MAC address C is learned by a frame that is sourced through one of the ports of LC2, the PI indicator is asserted for that entry. Therefore, the PI indicator is not asserted for the MAC address entry C in FwdT1 because that MAC address was learned through the UDlink1 coupled to the switching fabric.

When the aging process executing on LC2 sees that the PI indicator is asserted for a particular entry, it may age that entry according to the executed policy. The aging policy then informs the other line cards that a particular entry has been aged and removed from a forwarding table. Upon being informed of this occurrence, the microprocessors executing the aging policy on the other line cards proceed to remove their entries associated with the aged MAC address from their tables. This aspect of the invention further ensures synchronization of the forwarding tables in the distributed forwarding table switch.

MN Frames

As noted, the forwarding engine performs a forwarding decision operation using a destination MAC address of an incoming frame received at an ingress card. If the frame is received at the ingress card for the first time, the forwarding engine also "learns" a source MAC address of the frame. Learning an address comprises, inter alia, creating/updating an entry of the L2 forwarding table with the source MAC address and its location (index) within the switch. According to the invention, the forwarding engine then performs a flood-to-fabric (FF) operation on the frame by asserting all bits in the POE mask field of the fabric frame. The asserted POE bits instruct the switch fabric to switch ("flood") copies of the fabric frame through its port interfaces to all (egress) line cards of the network switch. The FF operation essentially forces each forwarding engine associated with each egress card to either (i) update its current L2 forwarding table entry with the newly-learned source MAC address and index of the frame or, if there is not a current entry, (ii) learn the source address/index of the frame.

The novel MN frame 800 is provided to complement the FF operation and, in accordance with the invention, may comprise either a positive MN frame or a negative MN frame, each of which involves use of the PI indicator. Specifically, the positive MN frame is employed when the PI indicator is asserted for a destination MAC address entry of the forwarding table on the egress card and the DI contained in the switched fabric frame (i.e., the ingress DI) is different from the DI stored in this egress forwarding table (i.e., the egress DI). In the illustrative embodiment, the positive MN frame may also be generated by the forwarding engine on the egress card in response to assertion of the SC bit in a routed frame received at that card. In order to ensure the consistency of the forwarding tables in the switch, the egress forwarding engine notifies the ingress forwarding engine as to the location of the destination MAC address using the positive MN frame.

Upon receiving the MN frame from the egress card, the ingress forwarding engine establishes or updates an appropriate entry in the L2 portion of its forwarding table using the contents of the source MAC address and source index fields of the MN frame. Notably, the contents of the source index field reflect the port and line card originating the MN frame, i.e., the outgoing port on the egress card. Accordingly, the ingress forwarding engine uses the source index of the MN frame as the destination index for the entry created in its L2 forwarding table.

In contrast, the negative MN frame is used when the PI indicator is not asserted for a destination MAC address entry of the egress forwarding table and the ingress DI is not the same as the egress DI. That is, when the egress forwarding engine receives a frame, it performs a "look-up" into its forwarding table for an entry having the destination MAC address of the frame. If the PI indicator is not asserted for that entry, the egress forwarding engine "knows" that the destination MAC address is not attached to a port for which it is responsible; therefore, the ingress forwarding table (i.e., the forwarding table associated with the line card from which the frame was forwarded) must have incorrect information stored therein. As a result, the egress forwarding engine generates the negative MN frame with the contents of the source index field set to "flood" and sends the frame to the ingress card. Upon receipt of the negative MN frame, the ingress forwarding engine learns "flood" as the destination index for the destination MAC address entry and thereafter performs a flood-to-VLAN (FV) operation for a frame having the destination MAC address.

While there has been shown and described an illustrative embodiment for synchronizing forwarding tables contained on line cards of a distributed network switch, it is to be understood that various other adaptations and modifications may be made within the spirit and scope of the invention. For example, assume that the end station C is moved from P2 on LC2 to P0 on LC3. When FE0 (i.e., the forwarding engine associated with the the ports on LC3) learns a MAC address entry for the first time, that forwarding engine performs a FF operation, which instructs its UDlink3 to assert all of the POE bits in the field 410 of the frame 600. This operation causes the frame 600 to be sent to all the line cards of the network switch, thereby allowing them to update their entries of their forwarding tables. That is, the FE1 updates its entry for MAC address C in FwdT1 to reflect an index of <3,0> instead of <2,2>. Accordingly, L3 shortcut operations executed by that forwarding engine to destination MAC address C are now switched to destination index <3,0>.

Furthermore, the MAC address C is learned by those forwarding engines whose forwarding tables do not have a current entry for that MAC address. If those forwarding engines do not need to know of that particular MAC address, it will be aged-out normally in accordance with the aging policy. In the case of FwdT1, that table is updated with the new index location <3,0> for MAC address C and the RM bit is cleared for that entry; accordingly, the entry C in FwdT1 is eligible for aging and, in fact, will be aged-out in due course.

Thereafter assume an incoming frame is received at LC1 having a L3 (IP address) destination of C and a L2 (MAC address) destination of the router. The frame is forwarded to the router where a L3 lookup operation is performed to obtain the new, rewritten MAC layer header (the "shortcut") and the new destination MAC address C is used by the forwarding engine of the SMC as a lookup into the L2 portion of FwdT0; in this case, the destination index for C is "empty" (null) because it was aged-out. Therefore, a flood-to-VLAN (FV) operation is performed for the VLAN associated with the outgoing frame. (Note that the egress VLAN changes as a result of the rewrite). When the flooded frame is received at LC3, FE0 examines the (ingress) destination index <"flood"> to ensure that it matches the destination index <3,0> stored in its table. Since the indexes do not match and the PI indicator associated with the MAC address C is asserted in the forwarding table FwdT0, FE0 generates a MN frame 800 to instruct LC1 of the proper location of the destination MAC address C. The FE1 then updates its FwdT1 with the correct index for this entry and sets the RM bit.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for updating and synchronizing forwarding tables contained on cards interconnected by a switch fabric of a distributed network switch, the forwarding tables including an ingress forwarding table associated with an ingress card and an egress forwarding table associated with an egress card of the switch, the method comprising the steps of:

switching a frame from the ingress card to the egress card, the switched frame containing a destination media access control (MAC) address and an ingress destination index (DI) representative of a location within the switch that is associated with the destination MAC address;

determining (i) whether a primary input (PI) indicator is asserted for an entry of the egress forwarding table associated with the destination MAC address and (ii) whether the ingress DI of the switched frame is different from an egress DI for the egress forwarding table entry;

generating a notification frame at the egress card for transfer to the ingress card, the notification frame including a source MAC address field and a source index field, the source index field having contents representative of a location within the switch associated with the source MAC address; and updating the ingress forwarding table with the contents of the source MAC address and source index fields to thereby synchronize the ingress and egress forwarding tables.

2. The method of claim 1 wherein the notification frame is a MAC notification (MN) frame.

3. The method of claim 2 wherein the step of generating comprises the step of, when the PI indicator is asserted and the ingress DI is different from the egress DI, generating a positive MN frame.

4. The method of claim 3 wherein the contents of the source index field reflect a port and line card within the switch that originates the MN frame.

5. The method of claim 4 wherein the originating port and line card comprise an outgoing port on an egress card.

6. The method of claim 3 wherein the step of updating comprises the step of establishing an entry in the ingress forwarding table using the contents of the source MAC address and source index fields of the positive MN frame.

7. The method of claim 2 wherein the step of generating comprises the steps of, when the PI indicator is not asserted and the ingress DI does not match the egress DI:

generating a negative MN frame at the egress card;

setting the contents of the source index field of the negative MN frame to a predetermined value representative of a flood operation; and sending the negative MN frame to the ingress card.

8. The method of claim 7 wherein the step of updating comprises the step of updating an entry associated with the destination MAC address in the ingress forwarding table with the predetermined value in the source index field of the negative MN frame.

9. The method of claim 8 wherein the predetermined value is representative of a flood-to-virtual local area network (VLAN) operation.

10. Apparatus for updating and synchronizing forwarding tables contained on cards interconnected by a switch fabric of a distributed network switch, the forwarding tables including an ingress forwarding table associated with an ingress card and an egress forwarding table associated with an egress card of the switch, the apparatus comprising:

a switch fabric for switching a frame from the ingress card to the egress card, the switched frame containing a destination media access control (MAC) address and an ingress destination index (DI) representative of a location within the switch that is associated with the destination MAC address in the switch;

means for determining (i) whether a primary input (PI) indicator is asserted for an entry of the egress forwarding table associated with the destination MAC address and (ii) whether the ingress DI of the switched frame is different from an egress DI for the egress forwarding table entry;

means for generating a notification frame at the egress card for transfer to the ingress card, the notification frame including a source MAC address field and a source index field, the source index field having contents representative of a location within the switch associated with the source MAC address; and means for updating the ingress forwarding table with the contents of the source MAC address and source index fields to thereby synchronize the ingress and egress forwarding tables.

11. The apparatus of claim 10 wherein the means for generating comprises a forwarding engine associated with the egress card.

12. The apparatus of claim 11 wherein the notification frame is a MAC notification (MN) frame.

13. The apparatus of claim 12 wherein the MN frame includes a port-of-exit field, a destination index field, a virtual local area network field and a destination MAC address field.

14. The apparatus of claim 13 wherein the MN frame further includes a don't forward (DF) bit which, when asserted, specifies forwarding of the MN frame only through the switch fabric.

15. The apparatus of claim 10 wherein the PI indicator is one of a single bit and a plurality of bits.

16. The apparatus of claim 15 wherein the PI indicator denotes a primary input MAC address directly attached to a port of the egress card associated with the entry of the egress forwarding table.

17. A computer readable medium containing executable program instructions for synchronizing forwarding tables contained on cards interconnected by a switch fabric of a distributed network switch, the forwarding tables including an ingress forwarding table associated with an ingress card and an egress forwarding table associated with an egress card of the switch, the executable program instructions comprising program instructions for:

switching a frame from the ingress card to the egress card, the switched frame containing a destination media access control (MAC) address and an ingress destination index (DI) representative of a location within the switch that is associated with the destination MAC address;

determining (i) whether a primary input (PI) indicator is asserted for an entry of the egress forwarding table associated with the destination MAC address and (ii) whether the ingress DI of the switched frame is different from an egress DI for the egress forwarding table entry;

generating a notification frame at the egress card for transfer to the ingress card, the notification frame including a source MAC address field and a source index field, the source index field having contents representative of a location within the switch associated with the source MAC address; and updating the ingress forwarding table with the contents of the source MAC address and source index fields to thereby synchronize the ingress and egress forwarding tables.

18. The computer readable medium of claim 17 wherein the notification frame is a MAC notification (MN) frame and wherein the program instruction for generating comprises the program instruction for, when the PI indicator is asserted and the ingress DI is different from the egress DI, generating a positive MN frame.

19. The computer readable medium of claim 18 wherein the program instruction for updating comprises the program instruction for establishing an entry in the ingress forwarding table using the contents of the source MAC address and source index fields of the positive MN frame.

20. The computer readable medium of claim 17 wherein the notification frame is a MAC notification (MN) frame and wherein the program instruction for generating comprises the program instructions for, when the PI indicator is not asserted and the ingress DI does not match the egress DI:

generating a negative MN frame at the egress card;

setting the contents of the source index field of the negative MN frame to a predetermined value representative of a flood operation; and sending the negative MN frame to the ingress card.

21. A method for updating and synchronizing forwarding tables contained on cards interconnected by a switch fabric of a distributed network switch, the method comprising the steps of:

providing a forwarding table on each card;

receiving a frame at a first card, hereinafter an ingress card;

switching the frame from the ingress card to an egress card, the switched frame containing a media access control (MAC) address associated with a destination end station and an ingress destination index (DI) representative of a location within the switch that is associated with the destination MAC address, the ingress DI determined by the ingress card using its forwarding table;

determining whether the ingress DI of the switched frame is different from an egress DI, the egress DI determined by the egress card using its forwarding table;

generating, in response to a difference between the ingress DI and egress DI, a notification frame at the egress card for transfer to the ingress card; and updating, responsive to the notification frame, the ingress forwarding table to match the egress forwarding table.

22. The method of claim 21 further comprising: matching the contents of a source MAC address and source index fields in the ingress and egress forwarding tables.

23. The method of claim 22 further comprising: determining whether a primary input (PI) indicator field in a forwarded frame is asserted, the PI indicator asserted for a forwarding table entry having a MAC address that is learned from a frame sourced through one of the ports of a source line card associated with a particular forwarding engine, and not asserted for an address that is learned through the switching fabric.

24. The method of claim 23 further comprising: making the notification frame a MAC notification (MN) frame.

25. The method of claim 24 further comprising: generating a positive MN frame when the PI indicator is asserted and the ingress DI is different from the egress DI.

26. The method of claim 25 further comprising: indicating, by the source index field, a port and line card within the switch that originates the MN frame.

27. The method of claim 25 further comprising: indicating, by the source index field, an outgoing port on an egress card within the switch that originates the MN frame.

28. The method of claim 25 further comprising: establishing an entry in the ingress forwarding table using the contents of the source MAC address and source index fields of the positive MN frame.

29. The method of claim 24 further comprising, when the PI indicator is not asserted and the ingress DI does not match the egress DI:
generating a negative MN frame at the egress card;
setting the contents of the source index field of the negative MN frame to a predetermined value representative of a flood operation; and
sending the negative MN frame to the ingress card.

30. The method of claim 29 further comprising: updating an entry associated with the destination MAC address in the ingress forwarding table with the predetermined value in the source index field of the negative MN frame.

31. The method of claim 30 further comprising: making the predetermined value be representative of a flood-to-virtual local area network (VLAN) operation.

32. A computer readable media, comprising: said computer readable media containing instructions for execution in a processor for the practice of the method of claim 1 or claim 21.

33. Electromagnetic signals propagating on a computer network, comprising: said electromagnetic signals carrying instructions for execution on a processor for the practice of the method of claim 1 or claim 21.

34. A distributed network switch, comprising:
an ingress card for receiving frames, the ingress card having an ingress forwarding table;
an egress card to send received frames, the egress card having an egress forwarding table; and
a forwarding engine for (i) switching the frame from the ingress card to an egress card, the switched frame containing a media access control (MAC) address associated with a destination end station and an ingress destination index (DI) representative of a location within the switch that is associated with the destination MAC address, the ingress DI determined by the ingress card using its forwarding table, (ii) determining whether the ingress DI of the switched frame is different from an egress DI, the egress DI determined by the egress card using its forwarding table, (iii) generating, in response to a difference between the ingress DI and egress DI, a notification frame at the egress card for transfer to the ingress card, and (iv) updating, responsive to the notification frame, the ingress forwarding table to match the egress forwarding table.

35. The apparatus of claim 34 further comprising: a source MAC address and source index fields in the ingress and egress forwarding tables to be updated responsive to the notification frame.

36. The apparatus of claim 35 further comprising: the forwarding engine is to determine whether a primary input (PI) indicator field in a forwarded frame is asserted, the PI indicator asserted for a forwarding table entry having a MAC address that is learned from a frame sourced through one of the ports of a source line card associated with a particular forwarding engine, and not asserted for an address that is learned through the switching fabric.

37. The apparatus of claim 36 further comprising: a MAC notification (MN) frame as the notification frame.

38. The apparatus of claim 37 further comprising: a port-of-exit field, a destination index field, a virtual local area network field, and a destination MAC address field, each contained within the MN frame.

39. The apparatus of claim 38 further comprising: a don't forward (DF) bit within the MN frame, which, when asserted, specifies forwarding of the MN frame only through the switch fabric.

40. The apparatus of claim 36 further comprising: a PI indicator, which is one of a single bit and a plurality of bits.

41. The apparatus of claim 36 further comprising: a PI indicator, which is one of a single bit and a plurality of bits, the PI indicator denoting a primary input MAC address directly attached to a port of the egress card associated with the entry of the egress forwarding table.

42. An apparatus for updating and synchronizing forwarding tables contained on cards interconnected by a switch fabric of a distributed network switch, comprising:
means for providing a forwarding table on each card;
means for receiving a frame at a first card, hereinafter an ingress card;
means for switching the frame from the ingress card to an egress card, the switched frame containing a media access control (MAC) address associated with a destination end station and an ingress destination index (DI) representative of a location within the switch that is associated with the destination MAC address, the ingress DI determined by the ingress card using its forwarding table;
means for determining whether the ingress DI of the switched frame is different from an egress DI, the egress DI determined by the egress card using its forwarding table;
means for generating, in response to a difference between the ingress DI and egress DI, a notification frame at the egress card for transfer to the ingress card; and
means for updating, responsive to the notification frame, the ingress forwarding table to match the egress forwarding table.

* * * * *